US012692938B2

(12) United States Patent
Yamada

(10) Patent No.: US 12,692,938 B2
(45) Date of Patent: Jul. 28, 2026

(54) PISTON RING SET

(71) Applicant: KABUSHIKI KAISHA RIKEN, Tokyo (JP)

(72) Inventor: Takeshi Yamada, Niigata (JP)

( * ) Notice: Subject to any disclaimer, the term of this patent is extended or adjusted under 35 U.S.C. 154(b) by 0 days.

(21) Appl. No.: 19/158,879

(22) PCT Filed: Feb. 28, 2023

(86) PCT No.: PCT/JP2023/007406
§ 371 (c)(1),
(2) Date: Aug. 22, 2025

(87) PCT Pub. No.: WO2024/180684
PCT Pub. Date: Sep. 6, 2024

(65) Prior Publication Data
US 2026/0117867 A1      Apr. 30, 2026

(51) Int. Cl.
F16J 9/20          (2006.01)
F02F 5/00          (2006.01)

(52) U.S. Cl.
CPC . F16J 9/20 (2013.01); F02F 5/00 (2013.01); F16J 9/203 (2013.01)

(58) Field of Classification Search
CPC ........ F16J 9/12; F16J 9/20; F16J 9/203; F02F 5/00
USPC ................................................. 277/496, 497
See application file for complete search history.

(56) References Cited

U.S. PATENT DOCUMENTS 5,619,795 A       4/1997  Miyoshi et al.
9,657,839 B2 *   5/2017  Meacham ................. F16J 9/12

| | | | | |
|---|---|---|---|---|
| 10,352,446 B2 * | 7/2019 | Ichikawa | ................. | C25D 5/50 |
| 2007/0176371 A1 * | 8/2007 | Yamada | ..................... | F16J 9/14 |
| | | | | 277/497 |
| 2015/0323073 A1 * | 11/2015 | Meacham | .................. | F16J 9/12 |
| | | | | 277/449 |
| 2017/0227126 A1 * | 8/2017 | Kawasaki | .................. | F16J 9/06 |
| 2017/0321803 A1 * | 11/2017 | Meacham | ............... | F16J 9/203 |
| 2017/0350508 A1 * | 12/2017 | Ichikawa | .................. | F16J 9/26 |

(Continued)

FOREIGN PATENT DOCUMENTS

| | | |
|---|---|---|
| CN | 103452691 | 12/2013 |
| CN | 107327352 | 11/2017 |

(Continued)

OTHER PUBLICATIONS

International Preliminary Report on Patentability with Written Opinion dated Sep. 11, 2025 for PCT/JP2023/007406.

(Continued)

*Primary Examiner* — Nicholas L Foster
(74) *Attorney, Agent, or Firm* — SHIPWAY IP

(57)          ABSTRACT

A piston ring set according to one aspect includes a top ring and an oil ring, and is inserted into a cylinder bore of an internal combustion engine, the top ring has an annular main body portion including an inner peripheral surface, an outer peripheral surface, one side surface and the other side surface substantially perpendicular to the inner peripheral surface, and a first joint end portion and a second joint end portion that face each other to form a joint portion, the oil ring has a pair of rails facing each other, a joint flow area of the top ring is 0.1 mm² or less, and the oil ring has an outer peripheral conformability coefficient of 0.3 or more.

6 Claims, 9 Drawing Sheets

(56)       References Cited

U.S. PATENT DOCUMENTS

| | | | |
|---|---|---|---|
| 2023/0013831 A1* | 1/2023 | Saito ......................... | F16J 9/12 |
| 2024/0003314 A1* | 1/2024 | Hegge ...................... | F02F 5/00 |
| 2024/0084894 A1 | 3/2024 | Yabune et al. | |

FOREIGN PATENT DOCUMENTS

| | | |
|---|---|---|
| JP | H7-158733 | 6/1995 |
| JP | H7-158734 | 6/1995 |
| JP | 2013-231481 | 11/2013 |
| JP | 2015-194222 | 11/2015 |
| JP | 2016-194373 | 11/2016 |
| JP | 2019-116918 | 7/2019 |
| JP | 2021-001612 | 1/2021 |
| JP | 2021-156375 | 10/2021 |
| WO | 2019/065830 | 4/2019 |
| WO | 2022/209592 | 10/2022 |

OTHER PUBLICATIONS

International Search Report dated May 16, 2023 for PCT/JP2023/007406.

* cited by examiner (a)

(b)

(c)

(a)

(b)

(a)

(b)

(c)

(d)

(a)

(b)

(a)

(b)

(c)

(d)

(a)

(b)

(c)

(d)

(e)

(f)

PISTON RING SET

CROSS-REFERENCE TO RELATED APPLICATIONS

This application is a 35 U.S.C. § 371 national phase application of PCT Application No. PCT/JP2023/007406, filed on Feb. 28, 2023.

TECHNICAL FIELD

The present disclosure relates to a piston ring set.

BACKGROUND ART

A piston ring set used in an internal combustion engine of an automobile or the like is mounted, for example, in a ring groove on the outer peripheral surface of a piston. The piston ring set mounted in the ring groove slides against the inner wall of the cylinder bore. The piston ring set maintains an airtight seal between the combustion chamber and the crank chamber, reducing oil consumption. As such a piston ring set, for example, the piston ring set described in Patent Literature 1 is known.

CITATION LIST

Patent Literature

[Patent Literature 1] Japanese Unexamined Patent Publication No. 2013-231481

SUMMARY OF INVENTION

Technical Problem

In order to improve the fuel efficiency of internal combustion engines, there is a demand to reduce the amount of blow-by gas that leaks into the crank chamber. However, as the amount of the blow-by gas decreases, the oil consumption and friction increase, and therefore it is difficult to favorably reduce all of the blow-by gas, the oil consumption, and the friction. One aspect of the present disclosure provides a piston ring set that can respectively reduce blow-by gas, oil consumption, and friction.

Solution to Problem

According to one aspect of the present disclosure, there is provided a piston ring set including a top ring and an oil ring, wherein the piston ring set is inserted into a cylinder bore of an internal combustion engine while attached to a piston, wherein the top ring includes an annular main body portion, wherein the annular main body portion includes: an inner peripheral surface; an outer peripheral surface; a first side surface and a second side surface substantially perpendicular to the inner peripheral surface; and a first joint end portion and a second joint end portion that face each other to form a joint portion, wherein the oil ring includes a pair of rails facing each other, wherein a joint flow area of the top ring is 0.1 mm$^2$ or less, and wherein an outer peripheral conformability coefficient of the oil ring is 0.3 or more.

In this piston ring set, the joint flow area of the top ring is 0.1 mm$^2$ or less, and the outer peripheral conformability coefficient of the oil ring is 0.3 or more. By setting the joint flow area to 0.1 mm$^2$ or less, blow-by gas can be reduced. However, as the amount of blow-by gas decreases, the amount of oil blown down by the blow-by gas decreases. This tends to increase excess oil adhering to the inner surface of the cylinder bore and also tends to increase friction at the top ring. Here, since the outer peripheral conformability coefficient of the oil ring is 0.3 or more, the oil ring follows the inner surface of the cylinder bore favorably. Therefore, excess oil that has adhered to the inner surface of the cylinder bore due to the top ring is favorably scraped off by the oil ring. Therefore, in a case where the piston ring set including both the top ring and the oil ring is used, the reduced oil consumption due to the oil ring exceeds the increased oil consumption due to the top ring. That is, by using the above piston ring set, blow-by gas, oil consumption, and friction can all be reduced. In particular, the friction of the piston ring set including both the top ring and the oil ring can be reduced to the same level as the friction of the piston ring set including the oil ring.

Advantageous Effects of Invention

According to one aspect of the present disclosure, it is possible to provide a piston ring set that can respectively reduce blow-by gas, oil consumption, and friction.

Figure 3:
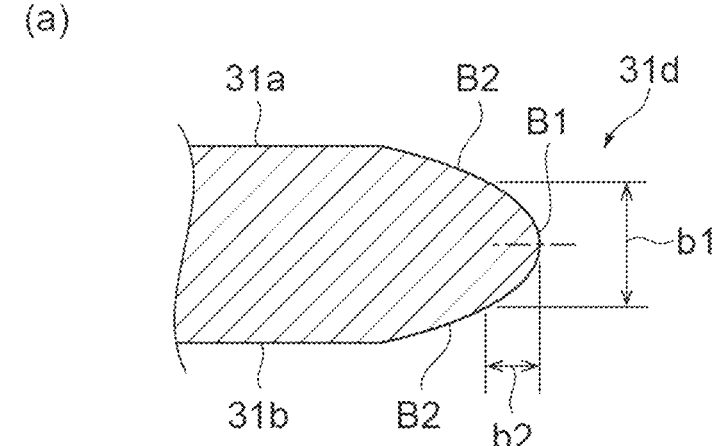
Figure 3:
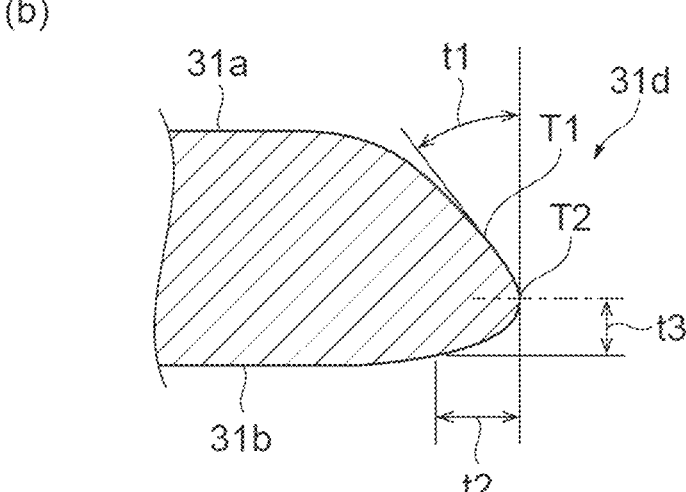
Figure 3:
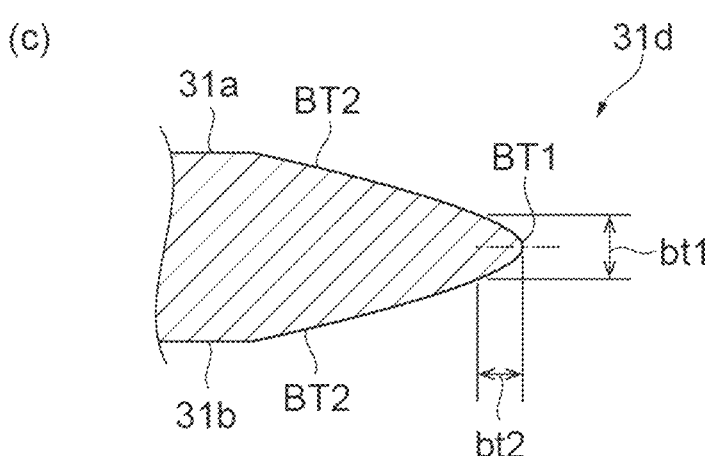

(a) of FIG. 3 is a cross-sectional view illustrating an example of a rail having a barrel face shape, (b) of FIG. 3 is a cross-sectional view illustrating an example of a rail having a tapered face shape, and (c) of FIG. 3 is a cross-sectional view illustrating an example of a bullet face shape.

Figure 4:
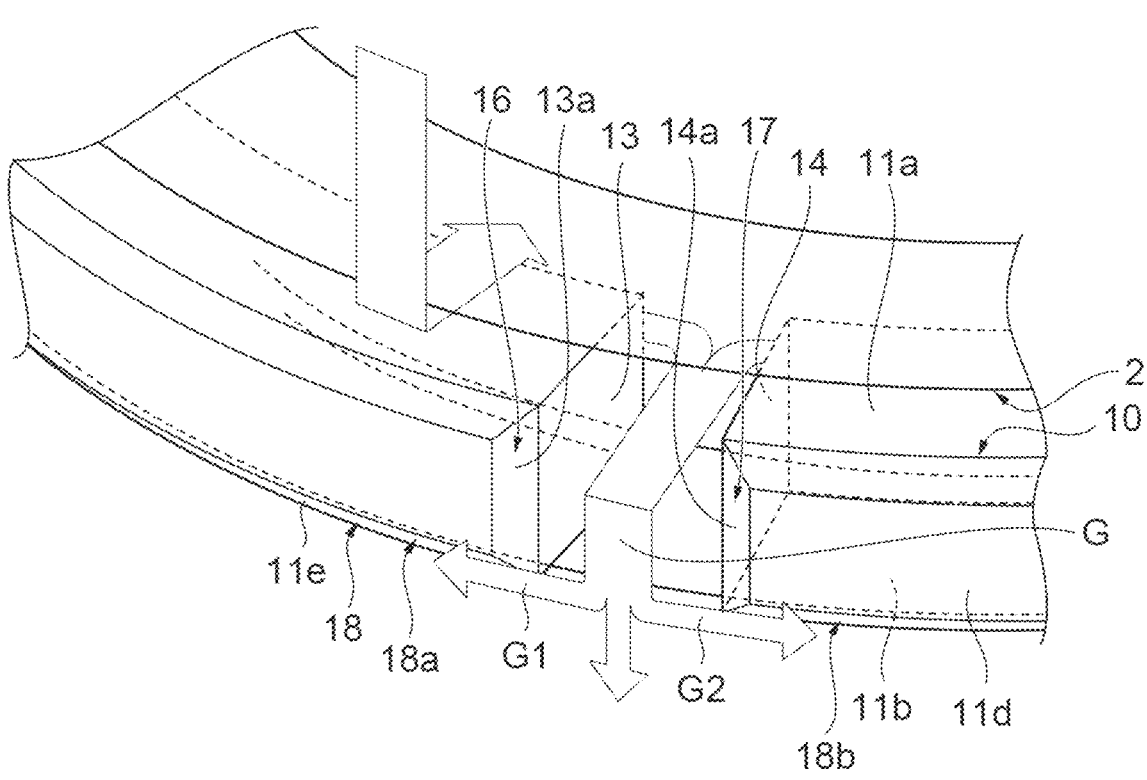

FIG. 4 is an enlarged schematic view of a main portion illustrating blow-by gas leaked from a top ring.

Figure 5:
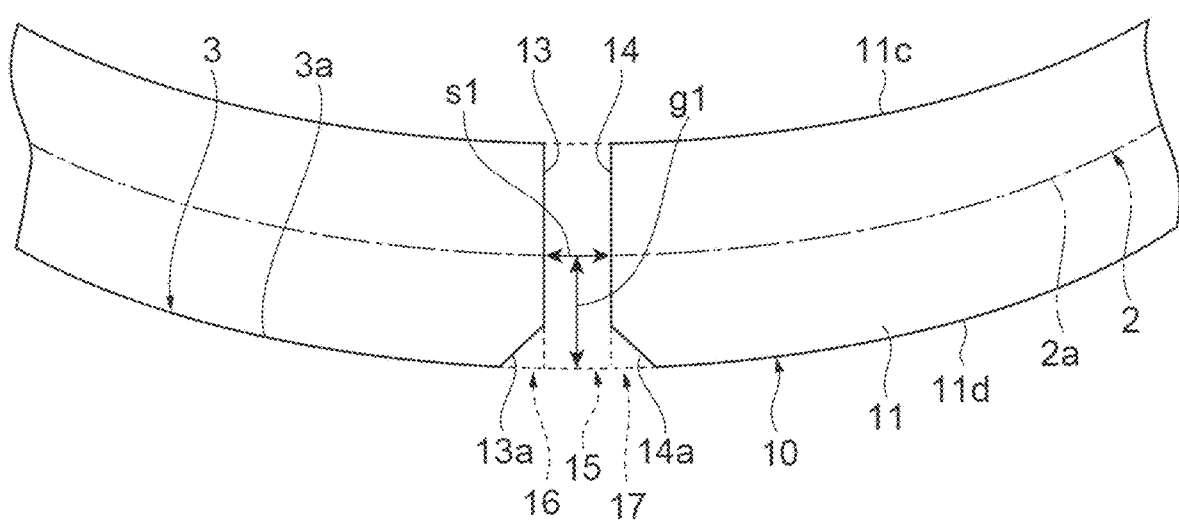
Figure 5:
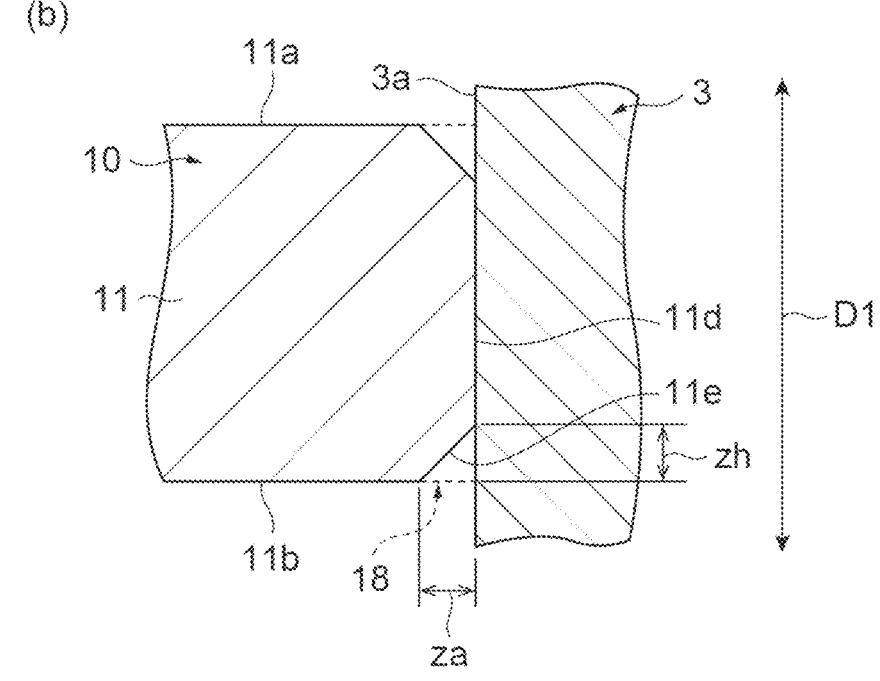

(a) of FIG. 5 is an enlarged schematic view of a main portion illustrating an example of a joint portion of the top ring, and (b) of FIG. 5 is an enlarged schematic view of a main portion illustrating an example of an outer peripheral lower surface chamfered portion of the top ring.

Figure 6:
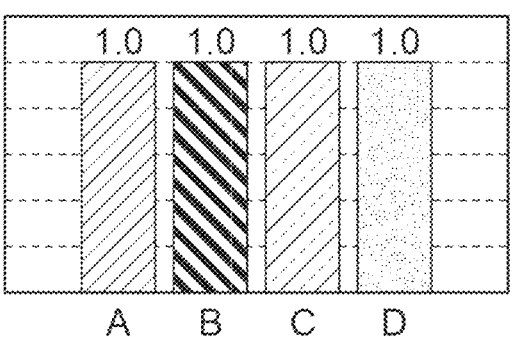

(a) to (c) of FIG. 6 are graphs showing the experimental results of a comparative example, and (d) of FIG. 6 is a graph showing the experimental results of an example.

Figure 7:
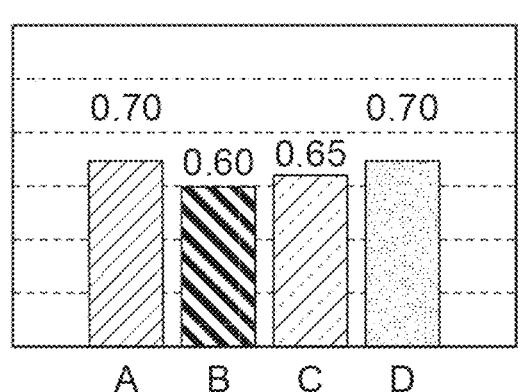
Figure 7:
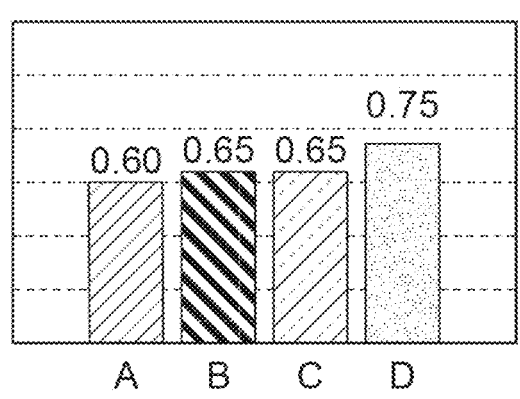

(a), (b) of FIG. 7 are graphs showing the experimental results of an example.

Figure 8:
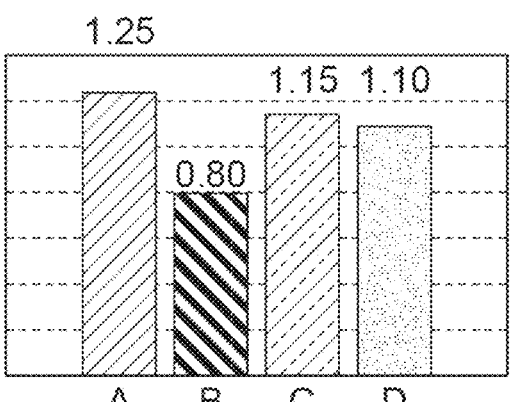
Figure 8:
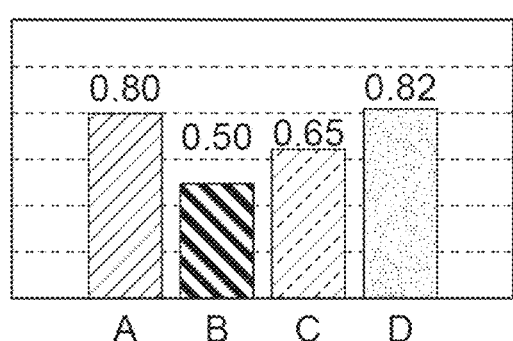
Figure 8:
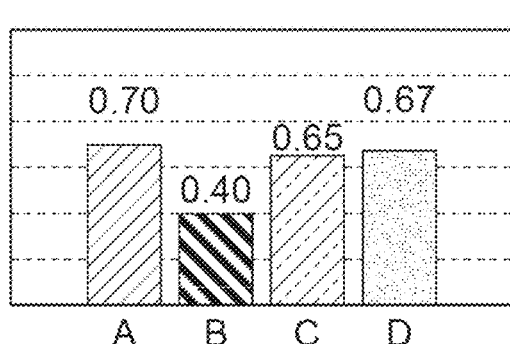
Figure 8:
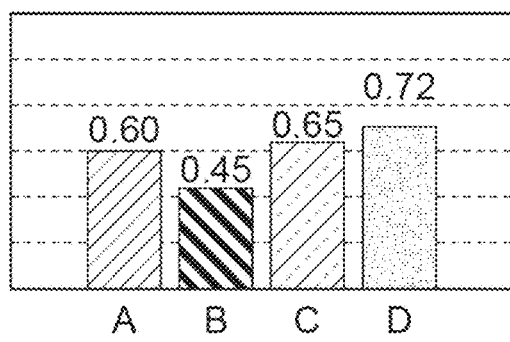

(a) of FIG. 8 is a graph showing the experimental results of a comparative example, and (b) to (d) of FIG. 8 are graphs showing the experimental results of examples.

Figure 9:
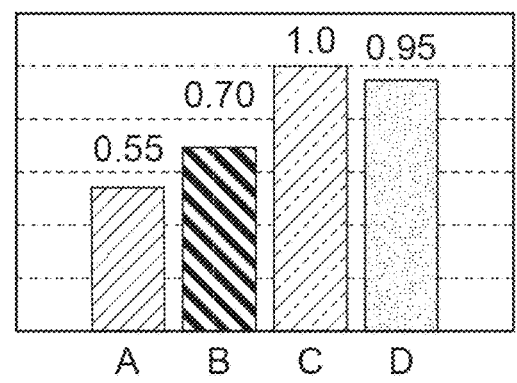
Figure 9:
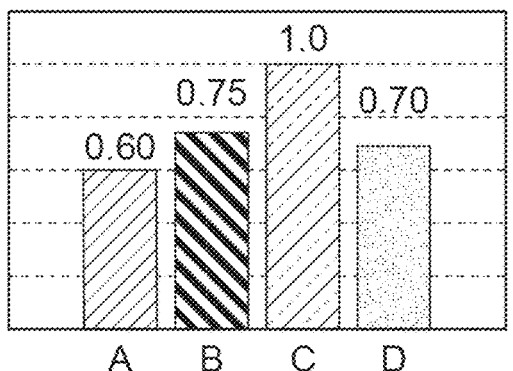
Figure 9:
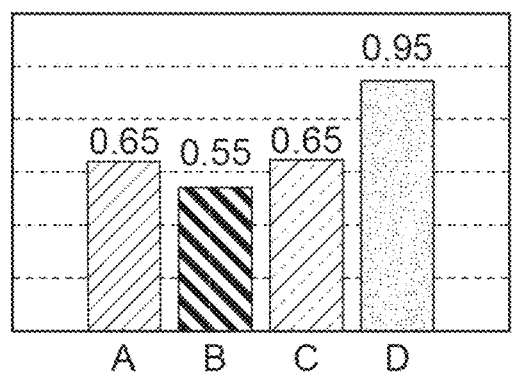
Figure 9:
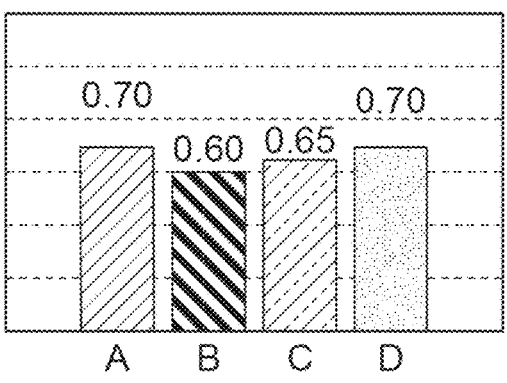
Figure 9:
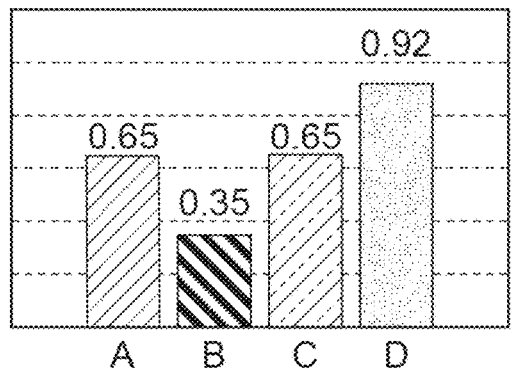
Figure 9:
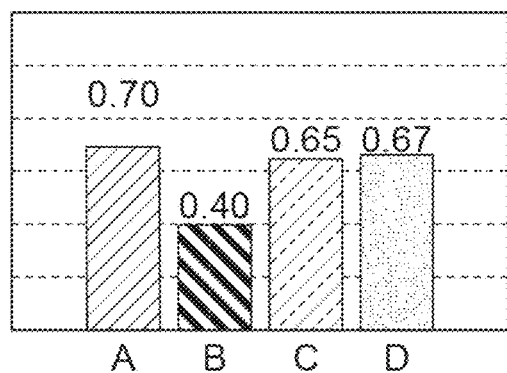

(a), (b) of FIG. 9 are graphs showing the experimental results of comparative examples, and (c) to (f) of FIG. 9 are graphs showing the experimental results of examples.

DESCRIPTION OF EMBODIMENTS

Overview of Embodiment of the Present Disclosure

First, an overview of the embodiment of the present disclosure will be described.

(1) A piston ring set including a top ring and an oil ring, wherein the piston ring set is inserted into a cylinder bore of an internal combustion engine while attached to a piston, wherein the top ring includes an annular main body portion, wherein the annular main body portion includes:

an inner peripheral surface;

an outer peripheral surface;
a first side surface and a second side surface substan-
tially
perpendicular to the inner peripheral surface; and
a first joint end portion and a second joint end portion
that face each other to form a joint portion,
wherein the oil ring includes a pair of rails facing each
other,
wherein a joint flow area of the top ring is 0.1 mm² or less,
and
wherein an outer peripheral conformability coefficient of
the oil ring is 0.3 or more.
(2) The piston ring set according to (1), wherein the outer
peripheral conformability coefficient of the oil ring is 0.8 or
less.
(3) The piston ring set according to (1) or (2),
wherein the main body portion includes:
a first joint chamfered surface located between the first
joint end portion and the outer peripheral surface;
a second joint chamfered surface located between the
second joint end portion and the outer peripheral
surface, and
an outer peripheral lower surface chamfered surface
located between one of the first side surface and the
second side surface and the outer peripheral surface,
and
wherein, when the top ring and the oil ring are inserted
into the cylinder bore while attached to the piston:
a first joint chamfered portion is formed between an
inner surface of the cylinder bore and the first joint
chamfered surface;
a second joint chamfered portion is formed between the
inner surface and the second joint chamfered surface;
and
an outer peripheral lower surface chamfered portion is
formed between the inner surface and the outer
peripheral lower surface chamfered surface;
the joint flow area is expressed as s1×g1×f+C1+C2+
2×C3, where a gap between the first joint end portion
and the second joint end portion is s1, a gap between
an outer surface of the piston and the inner surface of
the cylinder bore is g1, a correction coefficient based
on an inner diameter of the cylinder bore is f, a size
of the first joint chamfered portion is C1, a size of the
second joint chamfered portion is C2, and a size of
the outer peripheral lower surface chamfered portion
is C3; and
the outer peripheral conformability coefficient is
expressed as $3/2 \times Ft \times (d1-a1)^2/(E \times h12 \times a1^3)$, where a
tension of the oil ring is Ft, the inner diameter of the
cylinder bore is d1, a thickness of each of the pair of
rails along a radial direction of the cylinder bore is
a1, an elastic modulus of a material forming each of
the pair of rails is E, and a width of each of the pair
of rails along an axial direction of the cylinder bore
is h12.
(4) The piston ring set according to (3), wherein a
dimension of the outer peripheral lower surface chamfered
portion along the radial direction is smaller than a dimension
of the outer peripheral lower surface chamfered portion
along the axial direction.
(5) The piston ring set according to any one of (1) to (4),
further including a second ring,
wherein the second ring includes an annular second main
body portion including a third joint end portion and a
fourth joint end portion that face each other to form a
second joint portion, and wherein a ratio of a gap between the third joint end
portion and the fourth joint end portion to a gap
between the first joint end portion and the second joint
end portion is 1.8 or less.
(6) The piston ring set according to any one of (1) to (5),
wherein each outer peripheral surface of the pair of rails has
either a tapered face shape or a bullet face shape.

EXAMPLES OF EMBODIMENTS OF THE PRESENT DISCLOSURE

Hereinafter, embodiments of the present disclosure will
be described with reference to the drawings. In the descrip-
tion of the drawings, the same or corresponding elements are
given the same symbols, and duplicate descriptions are
omitted as appropriate.

Figure 1:
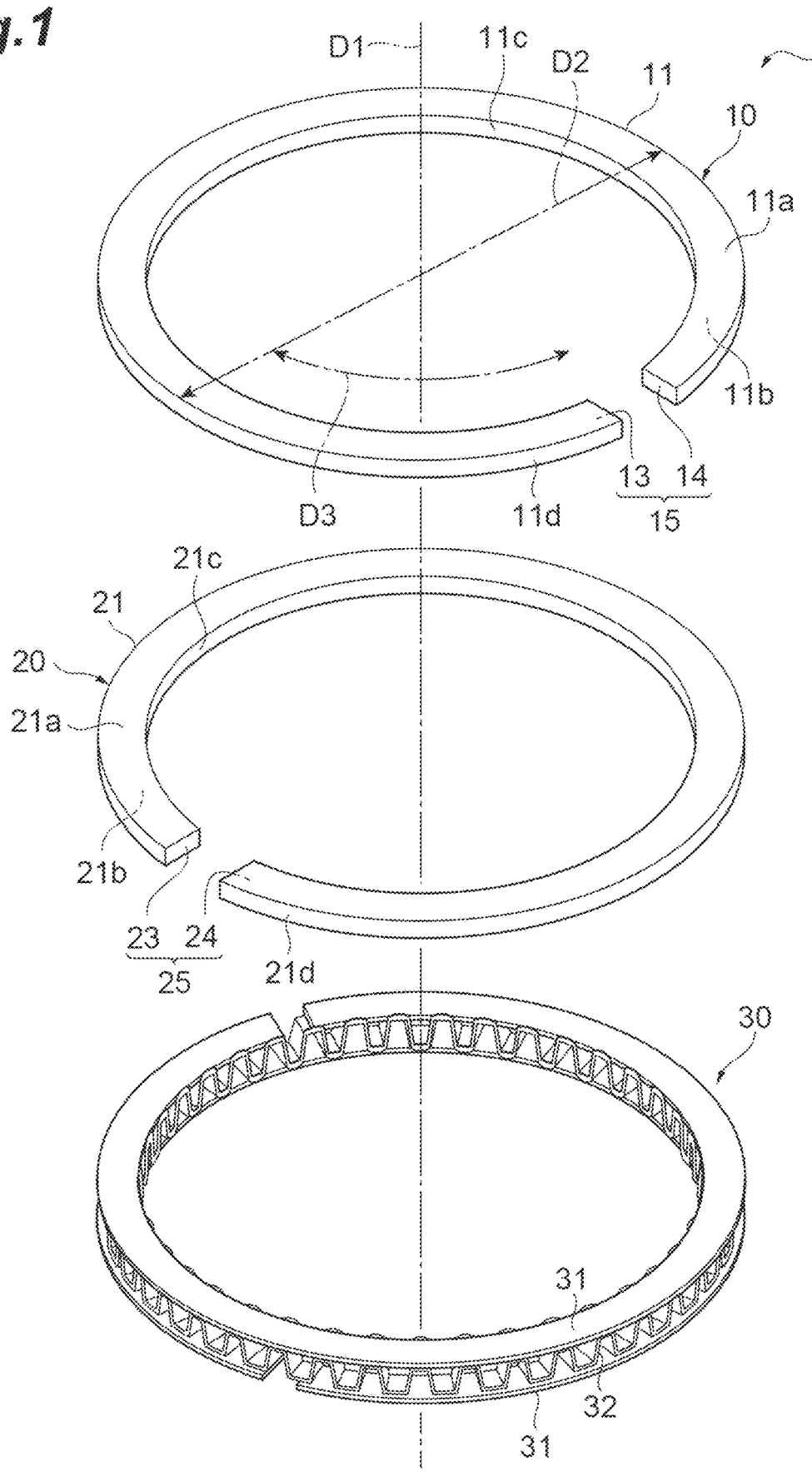
FIG. 1 is a perspective view of a piston ring set according to an embodiment.

FIG. 1 is a perspective view of a piston ring set according
to an embodiment. The top ring 10, the second ring 20, and
the oil ring 30 illustrated in FIG. 1 form a piston ring set 1.
The piston ring set 1 is mounted in a ring groove on the outer
peripheral surface of a piston in, for example, an internal
combustion engine of an automobile. The piston ring set 1
is inserted into a cylinder bore of an internal combustion
engine while attached to a piston. The piston ring set 1 slides
against the inner wall of the cylinder bore, thereby providing
a gas seal between the combustion chamber and the crank
chamber, and reducing oil consumption.

The top ring 10 has an annular main body portion 11. The
main body portion 11 includes a side surface (first side
surface) 11a, a side surface (second side surface) 11b, an
inner peripheral surface 11c, an outer peripheral surface 11d,
a joint end portion (first joint end portion) 13, and a joint end
portion (second joint end portion) 14. The side surfaces 11a
and 11b are substantially perpendicular to the inner periph-
eral surface 11c. In the example of FIG. 1, the side surface
11a is the upper surface of the main body portion 11, and the
side surface 11b is the lower surface of the main body
portion 11. The joint end portions 13 and 14 face each other
to form a joint portion 15. In the following description, the
direction connecting the side surface 11a and the side
surface 11b is defined as a width direction of the top ring 10,
and the direction connecting the inner peripheral surface 11c
and the outer peripheral surface 11d is defined as a thickness
direction of the top ring 10. The width direction of the top
ring 10 corresponds to an axial direction D1 of the cylinder
bore into which the piston ring set 1 is inserted. The
thickness direction of the top ring 10 corresponds to a radial
direction D2 of the cylinder bore into which the piston ring
set 1 is inserted. The direction in which the main body
portion 11 extends in an annular shape corresponds to a
circumferential direction D3 of the cylinder bore.

The main body portion 11 has a generally rectangular
cross section with its long side in the thickness direction and
its short side in the width direction. The main body portion
11 is formed using, for example, cast iron or steel containing
a plurality of metal elements, and has sufficient strength,
heat resistance, and elasticity.

The surface of the main body portion 11 may be subjected
to surface modification to form a hard film. The hard film is,
for example, a physical vapor deposition film (PVD film)
formed by using a physical vapor deposition method (PVD
method). This allows the hard film to be formed with
sufficient hardness. The hard film is an ion plating film
containing at least one of titanium (Ti) and chromium (Cr)
and at least one of carbon (C), nitrogen (N) and oxygen, or
a diamond-like carbon film. Specific examples of the hard
film include a titanium nitride film, a chromium nitride film, a titanium carbonitride film, a chromium carbonitride film, a chromium oxynitride film, a chromium film, or a titanium film. From the viewpoints of wear resistance and scuff resistance, the hard film may be a chromium nitride film. The hard film may be a laminate, and may include, for example, a chromium nitride film and a diamond-like carbon film.

The joint portion 15 is a void formed by cutting off a part of the main body portion 11. The joint end portions 13 and 14 are each a free end of the main body portion 11. The size of the joint portion 15 is indicated as a gap s1 between the joint end portions 13 and 14 when the top ring 10 is inserted into the cylinder bore at room temperature.

The second ring 20 has an annular main body portion 21. The main body portion 21 includes a side surface 21a, a side surface 21b, an inner peripheral surface 21c, an outer peripheral surface 21d, a joint end portion (third joint end portion) 23, and a joint end portion (fourth joint end portion) 24. The side surfaces 21a and 21b are substantially perpendicular to the inner peripheral surface 21c. In the example of FIG. 1, the side surface 21a is the upper surface of the main body portion 21, and the side surface 21b is the lower surface of the main body portion 21. The joint end portions 23 and 24 face each other to form a joint portion (second joint portion) 25. The main body portion 21 may be made of the same material as the top ring 10. The surface of the main body portion 21 may be subjected to surface modification to form a hard film, similar to the top ring 10.

The joint portion 25 is a void formed by cutting off a part of the main body portion 21. The joint end portions 23 and 24 are each a free end of the main body portion 21. The size of the joint portion 25 is indicated as a gap s2 between the joint end portions 23 and 24 when the second ring 20 is inserted into the cylinder bore at room temperature. Hereinafter, a ratio of the gap s2 to the gap s1 (s2/s1) will be referred to as an "S1 ratio." In the present embodiment, the S1 ratio is 1.8 or less. The S1 ratio may be 1.5 or less. The S1 ratio may be 1.4 or less.

The oil ring 30 has a pair of rails 31 that face each other and a spacer expander 32. Each of the pair of rails 31 is a side rail of the oil ring 30. The spacer expander 32 is disposed between the pair of rails 31. In the present embodiment, the pair of rails 31 and the spacer expander 32 form a three-piece oil ring 30. Each of the pair of rails 31 has a joint portion formed therein.

Figure 2:
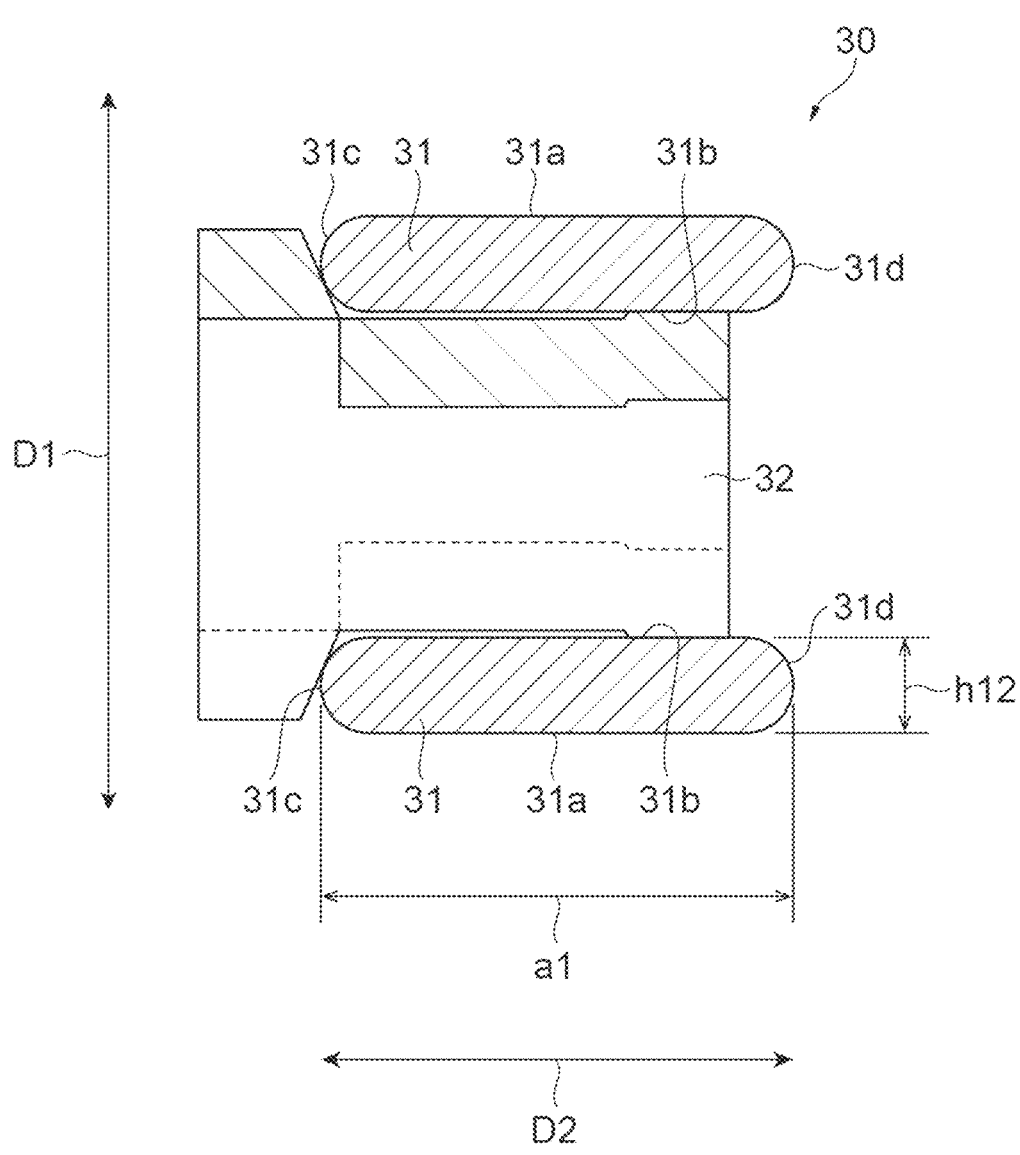
FIG. 2 is a cross-sectional view of an oil ring according to the embodiment.

FIG. 2 is a cross-sectional view of the oil ring according to the embodiment. FIG. 2 illustrates the configuration of the oil ring 30 in a cross section perpendicular to the circumferential direction D3. As illustrated in FIG. 2, each rail 31 has a side surface 31a, a side surface 31b, an inner peripheral surface 31c, and an outer peripheral surface 31d. The side surface 31a and the side surface 31b form both ends of each rail 31 in the axial direction D1. In the example of FIG. 2, the side surface 31a is a surface facing outward, and the side surface 31b is a surface facing the spacer expander 32. Each rail 31 may be made of the same material as the top ring 10. The shape of the outer peripheral surface 31d will be described in detail later.

An outer peripheral conformability coefficient k of the oil ring 30 is expressed by the following formula.

$$k = 3/2 \times Ft \times (d1 - a1)^2/(E \times h12 \times a1^3)$$

Ft is the tension of the oil ring 30. The tension Ft of the oil ring 30 is not particularly limited. From the viewpoint of reducing friction, the tension Ft may be 20 N or less, 15 N or less, or 12 N or less. d1 is the inner diameter of the cylinder bore into which the oil ring 30 is inserted. a1 is the thickness of each rail 31 along the radial direction D2. E is the elastic modulus of the material forming each rail 31. h12 is the width of each rail 31 along the axial direction D1. The oil ring 30 has an outer peripheral conformability coefficient k of 0.3 or more. The outer peripheral conformability coefficient k of the oil ring 30 may be 0.4 or more, or may be 0.5 or more. In the present embodiment, the outer peripheral conformability coefficient k of the oil ring 30 is 0.3 or more and 0.8 or less.

By setting the outer peripheral conformability coefficient k to 0.8 or less, an increase in oil consumption caused by deformation of the rail 31 is less likely to occur. From the viewpoint of achieving both a lower tension Ft and an improved outer peripheral conformability coefficient k, the thickness a1 may be 1.65 mm or less, or 1.50 mm or less. The lower limit of the thickness a1 is not particularly limited. From the viewpoint of the rigidity of the rail 31, the lower limit of the thickness a1 may be 1.30 mm or more.

(a) to (c) of FIG. 3 are cross-sectional views illustrating the details of the shape of the outer peripheral surface 31d. Each rail 31 may have a barrel face shape. (a) of FIG. 3 is a cross-sectional view illustrating an example of a rail having a barrel face shape. As illustrated in (a) of FIG. 3, the outer peripheral surface 31d includes a sliding surface B1 having a first radius of curvature and a pair of edge surfaces B2 having a second radius of curvature. The sliding surface B1 is curved to protrude toward the cylinder bore into which the oil ring 30 is inserted. The sliding surface B1 is sandwiched between a pair of edge surfaces B2 in the axial direction D1. One edge surface B2 is located between the side surface 31a and the sliding surface B1, and connects the side surface 31a and the sliding surface B1 to each other. The other edge surface B2 is located between the side surface 31b and the sliding surface B1, and connects the side surface 31b and the sliding surface B1 to each other. The first radius of curvature is smaller than the second radius of curvature. The length of the sliding surface B1 along the axial direction D1 is expressed as b1. The length of the sliding surface B1 along the radial direction D2 is expressed as b2. In the barrel face shape, the shape of the outer peripheral surface 31d may be symmetrical or asymmetrical with respect to the center line of the rail 31 in the axial direction D1.

Each rail 31 may have a tapered face shape. (b) of FIG. 3 is a cross-sectional view illustrating an example of a rail having a tapered face shape. As illustrated in (b) of FIG. 3, the outer peripheral surface 31d includes an inclined surface T1 that extends linearly and is inclined with respect to the axial direction D1, and a sliding surface T2. The inclined surface T1 is sloped to protrude toward the cylinder bore into which the oil ring 30 is inserted as the distance between the inclined surface T1 and the side surface 31b decreases. The sliding surface T2 is curved to protrude toward the cylinder bore into which the oil ring 30 is inserted. The inclination of the inclined surface T1 with respect to the axial direction D1 is expressed as t1. The length of the sliding surface T2 along the radial direction D2 is expressed as t2. The length along the axial direction D1 between the most protruding portion of the sliding surface T2 and the side surface 31b is expressed as t3. In the tapered face shape, the shape of the outer peripheral surface 31d is asymmetric with respect to the center line of the rail 31 in the axial direction D1.

Each rail 31 may have a bullet face shape. (c) of FIG. 3 is a cross-sectional view illustrating an example of a rail having a bullet face shape. As illustrated in (c) of FIG. 3, the outer peripheral surface 31$d$ includes a sliding surface BT1 having a third radius of curvature and a pair of edge surfaces BT2 extending linearly. The sliding surface BT1 is curved to protrude toward the cylinder bore into which the oil ring 30 is inserted. The sliding surface BT1 is sandwiched between a pair of edge surfaces BT2 in the axial direction D1. The pair of edge surfaces BT2 connect the side surfaces 31$a$ and 31$b$ and the sliding surface BT1 to each other. The length of the sliding surface BT1 along the axial direction D1 is expressed as bt1. The length of the sliding surface BT1 along the radial direction D2 is expressed as bt2.

FIG. 4 is an enlarged schematic view of a main portion illustrating blow-by gas leaked from a top ring. (a) of FIG. 5 is an enlarged schematic view of a main portion illustrating an example of a joint portion of the top ring, and (b) of FIG. 5 is an enlarged schematic view of a main portion illustrating an example of an outer peripheral lower surface chamfered portion of the top ring. As illustrated in FIGS. 4 and 5, the main body portion 11 includes chamfered surfaces 13$a$ and 14$a$ and a chamfered surface 11$e$.

The chamfered surface 13$a$ is located between the joint end portion 13 and the outer peripheral surface 11$d$, and is a surface (a first joint chamfered surface) that connects the joint end portion 13 and the outer peripheral surface 11$d$. The chamfered surface 13$a$ is a surface formed by chamfering the corner formed by the joint end portion 13 and the outer peripheral surface 11$d$. A joint chamfered portion (a first joint chamfered portion) 16 is formed between the chamfered surface 13$a$ and an inner surface 3$a$ of the cylinder bore 3. The joint chamfered portion 16 is a void corresponding to a portion removed from the main body portion 11 by chamfering the corner formed by the joint end portion 13 and the outer peripheral surface 11$d$. The chamfered surface 14$a$ is located between the joint end portion 14 and the outer peripheral surface 11$d$, and is a surface (a second joint chamfered surface) that connects the joint end portion 14 and the outer peripheral surface 11$d$. The chamfered surface 14$a$ is a surface formed by chamfering the corner formed by the joint end portion 14 and the outer peripheral surface 11$d$. The joint chamfered portion 17 is a void corresponding to a portion removed from the main body portion 11 by chamfering the corner formed by the joint end portion 14 and the outer peripheral surface 11$d$. A joint chamfered portion (a second joint chamfered portion) 17 is formed between the chamfered surface 14$a$ and the inner surface 3$a$ of the cylinder bore 3. The area of the joint chamfered portion 16 as viewed along the axial direction D1 is indicated as C1. The area of the joint chamfered portion 17 as viewed along the axial direction D1 is indicated as C2. Each of the areas C1 and C2 can be measured or obtained by known methods.

As illustrated in FIG. 4, in the present embodiment, the chamfered surfaces 13$a$ and 14$a$ are surfaces obtained by C-chamfering the corners formed by the joint end portions 13 and 14 and the outer peripheral surface 11$d$ at 45 degrees. Therefore, when the chamfer dimension of the chamfered surface 13$a$ is x, the area C1 is expressed as C1=$x^2$/2. Similarly, when the chamfer dimension of the chamfered surface 14$a$ is y, the area C2 is expressed as C2=$y^2$/2.

The chamfered surface 11$e$ is located between the side surface 11$b$ and the outer peripheral surface 11$d$, and is a surface (outer peripheral lower surface chamfered surface) that connects the side surface 11$b$ and the outer peripheral surface 11$d$. The chamfered surface 11$e$ is a surface formed by chamfering the corner formed by the outer peripheral surface 11$d$ and the side surface 11$b$. An outer peripheral lower surface chamfered portion 18 is formed between the chamfered surface 11$e$ and the inner surface 3$a$ of the cylinder bore 3. The outer peripheral lower surface chamfered portion 18 is a void corresponding to a portion removed from the main body portion 11 by chamfering the corner formed by the side surface 11$b$ and the outer peripheral surface 11$d$. The area of the outer peripheral lower surface chamfered portion 18 as viewed along the circumferential direction D3 is indicated as C3. The chamfered surface 11$e$ is a surface obtained by chamfering the corner formed by the outer peripheral surface 11$d$ and the side surface 11$b$ at an arbitrary angle (for example, 45 degrees), or by R-chamfering (rounding) the corner. As illustrated in (b) of FIG. 5, in the present embodiment, the chamfered surface 11$e$ is a surface obtained by chamfering the corner formed by the outer peripheral surface 11$d$ and the side surface 11$b$ at an arbitrary angle. In this case, when the dimension of the chamfered surface 11$e$ along the axial direction D1 is zh and the dimension of the chamfered surface 11$e$ along the radial direction D2 is za, the area C3 is expressed as C3=zh×za/2.

The dimension za of the outer peripheral lower surface chamfered portion 18 along the radial direction D2 may be smaller than the dimension zh of the outer peripheral lower surface chamfered portion 18 along the axial direction D1. When the dimension za is smaller than the dimension zh, it becomes difficult for oil to excessively enter the sliding surface B1. As a result, the oil scraping performance of the top ring 10 is improved. The dimension za may be less than 0.12 mm, may be less than 0.09 mm, or may be less than 0.06 mm. The lower limit of the dimension za is not particularly limited. From the viewpoint of preventing cracking of the hard film, the dimension za may be greater than 0.02 mm. Even when the chamfered surface 11$e$ is an R-chamfered surface, the dimension za may be smaller than the dimension zh.

As illustrated in FIG. 4, the blow-by gas G leaked from the top ring 10 passes through at least one of the joint portion 15, the joint chamfered portions 16 and 17, and the outer peripheral lower surface chamfered portion 18. The blow-by gas G passing through the outer peripheral lower surface chamfered portion 18 includes blow-by gas G1 passing through the outer peripheral lower surface chamfered portion 18$a$ adjacent to the joint end portion 13, and blow-by gas G2 passing through the outer peripheral lower surface chamfered portion 18$b$ adjacent to the joint end portion 14. In the present embodiment, the area of the outer peripheral lower surface chamfered portion 18$a$ as viewed along the circumferential direction D3 and the area of the outer peripheral lower surface chamfered portion 18$b$ as viewed along the circumferential direction D3 are each equal to the area C3. In addition, the area of the outer peripheral lower surface chamfered portion 18$a$ as viewed along the circumferential direction D3 and the area of the outer peripheral lower surface chamfered portion 18$b$ as viewed along the circumferential direction D3 may be different from each other.

The flow rate of the blow-by gas G changes depending on the joint flow area I. The joint flow area I is determined from the joint portion 15, the joint chamfered portions 16 and 17, and the outer peripheral lower surface chamfered portions 18$a$ and 18$b$ of the top ring 10 inserted into the cylinder bore 3 while attached to the piston 2. The joint flow area I is the sum of the area of the joint portion 15 as viewed along the axial direction D1, the area C1 of the joint chamfered portion 16 as viewed along the axial direction D1, the area C2 of the joint chamfered portion 17 as viewed along the axial direction D1, the area C3 of the outer peripheral lower surface chamfered portion 18a adjacent to the joint end portion 13 as viewed along the circumferential direction D3, and the area C3 of the outer peripheral lower surface chamfered portion 18b adjacent to the joint end portion 14.

As illustrated in (a) of FIG. 5, a gap between an outer surface 2a of the piston 2 to which the top ring 10 is attached and the inner surface 3a of the cylinder bore 3 into which the top ring 10 is inserted is indicated as g1. Specifically, g1 is equal to (the inner diameter of the cylinder bore 3–the diameter of the upper end portion of the second land of the piston 2)/2. g1 may be set in the range of 0.05 mm or more and 0.5 mm or less.

In the present embodiment, the area of the joint portion 15 when the top ring 10 inserted into the cylinder bore 3 while attached to the piston 2 is viewed along the axial direction D1 is expressed as s1×g1. In this case, since the gap s1 between the joint end portions 13 and 14 is proportional to the diameter of the top ring 10, a correction coefficient f is introduced. The correction coefficient f is the ratio between the inner diameter of the cylinder bore serving as a reference and the inner diameter of the cylinder bore 3 into which the top ring 10 is inserted. When the inner diameter of the cylinder bore serving as a reference for the correction coefficient f is X and the inner diameter of the cylinder bore 3 is Y, the correction coefficient f is expressed as f=X/Y. In the present embodiment, the inner diameter of the cylinder bore serving as a reference is set to 980. Therefore, the correction coefficient f is expressed as f=80/Y. The area of the joint portion 15 into which the correction coefficient f has been introduced is expressed as s1×g1×f. Therefore, the joint flow area I is expressed by the following formula. In the present embodiment, the joint flow area I of the top ring 10 is 0.1 mm$^2$ or less. The joint flow area I of the top ring 10 may be 0.07 mm$^2$ or less. The joint flow area I may be 0.05 mm$^2$ or less, or 0.03 mm$^2$ or less.

$$I = s1 \times g1 \times f + C1 + C2 + 2 \times C3$$

In addition, when the area C31 of the outer peripheral lower surface chamfered portion 18a as viewed along the circumferential direction D3 and the area C32 of the outer peripheral lower surface chamfered portion 18b as viewed along the circumferential direction D3 are different from each other, 2×C3 is replaced with the sum of C31 and C32.

In the piston ring set 1 described above, the joint flow area of the top ring 10 is 0.1 mm$^2$ or less, and the outer peripheral conformability coefficient of the oil ring 30 is 0.3 or more. By setting the joint flow area to 0.1 mm$^2$ or less, the blow-by gas G can be reduced. However, as the amount of blow-by gas G decreases, the amount of oil blown (carried) down by the blow-by gas G decreases. This tends to increase excess oil adhering to the inner surface 3a of the cylinder bore 3 and also tends to increase friction at the top ring 10. Here, since the outer peripheral conformability coefficient of the oil ring 30 is 0.3 or more, the oil ring 30 follows the inner surface 3a of the cylinder bore 3 favorably. Therefore, excess oil that has adhered to the inner surface 3a of the cylinder bore 3 due to the top ring 10 is favorably scraped off by the oil ring 30. Therefore, in a case where the piston ring set 1 including both the top ring 10 and the oil ring 30 is used, the reduced oil consumption due to the oil ring 30 exceeds the increased oil consumption due to the top ring 10. That is, by using the piston ring set 1, the blow-by gas G, the oil consumption, and the friction can all be reduced. In particular, the friction of the piston ring set 1 including both the top ring 10 and the oil ring 30 can be reduced to the same level as the friction of a piston ring set including the oil ring 30.

In a piston ring set in which a top ring having a large joint flow area (larger than 0.1 mm$^2$) and a second ring having a small joint gap are combined, the S1 ratio is small. In this case, the pressure in the second land increases due to the blow-by gas G, and the top ring tends to flutter. When the top ring flutters, the amount of blow-by gas G, the oil consumption, and the friction increase. The piston ring set 1 exhibits a synergistic effect of suppressing fluttering of the top ring 10, by combining the top ring 10 having a small joint flow area (0.1 mm$^2$ or less) with the second ring 20 having a small joint gap, even if the S1 ratio is 1.8 or less. As a result, the piston ring set 1 can favorably reduce the amount of blow-by gas, the oil consumption, and the friction.

The present disclosure has been described above in detail based on the embodiments. However, the present disclosure is not limited to the above embodiments. The present disclosure can be modified in various ways without departing from the spirit and scope of the present disclosure.

The oil ring is not limited to a three-piece oil ring. The oil ring may be a two-piece oil ring. The outer peripheral conformability coefficient of the two-piece oil ring is determined based on the cross-sectional shape of the two-piece oil ring. Each of the joint chamfered portion and the outer peripheral lower surface chamfered portion is not limited to a C-chamfer. Each of the joint chamfered portion and the outer peripheral lower surface chamfered portion may be an R-chamfer. The S1 ratio is not limited to 1.8 or less.

The shape of the outer peripheral surface of the top ring may be any of a barrel face shape, an eccentric barrel face shape, and a tapered face shape. The cross-sectional shape of the second ring may be any of a scraper, a balance scraper, a napier, or a balance napier. The shape of the outer peripheral surface of the second ring may be any of a tapered face shape, a barrel face shape, or an eccentric barrel face shape. The shape of the outer peripheral surface of the rail of the oil ring may be any of a tapered face shape, a barrel face shape, an eccentric barrel face shape, and a bullet face shape. The oil ring may have a surface pressure of 0.35 MPa or more and an outer peripheral surface having a barrel face shape.

EXAMPLES

The present disclosure will be described in more detail with reference to the following examples, but the present disclosure is not limited to these examples.

Each of FIGS. 6 to 9 is a graph showing the experimental results of a comparative example or an example. In each of FIGS. 6 to 9, the oil consumption, the amount of blow-by gas, and the magnitude of friction were measured for the internal combustion engines employing the piston ring sets according to the comparative example and the example. The cylinder bore of the internal combustion engine has an inner diameter of φ73. Oil consumption was measured under the driving conditions of "low RPM (low engine speed) and high load" and "pattern conditions." In the "low RPM and high load" test, oil consumption was measured during acceleration from a stop (idle) and during acceleration on a slope under driving conditions (for example, 1000 to 2000 rpm× 100% load driving). In the "pattern conditions," oil consumption was measured under driving conditions simulating driving in an urban area, which consisted of repeated cycles of engine stop, idling, acceleration, deceleration, constant speed, acceleration, and deceleration.

In the experimental results of the comparative example and the example shown in each of FIGS. 6 to 9, the oil consumption (grams) per hour was measured as "oil consumption at low RPM and high load [g/hr]" and "oil consumption under pattern conditions [g/hr]", the amount of blow-by gas per minute (liters) was measured as "blow-by at low RPM and high load [L/min]", and the magnitude of friction (watts) was measured as "friction under pattern conditions [W]." The experimental results of each of the comparative examples and the examples are shown as relative evaluation values with Comparative Example 1 illustrated in (a) of FIG. 6 as the standard. In other words, the experimental results of Comparative Example 1 for "oil consumption at low RPM and high load," "oil consumption under pattern conditions," "blow-by at low RPM and high load," and "friction under pattern conditions" are each set to 1.00, and the magnitude of each of the experimental results of the comparative examples and examples is shown as a percentage relative to the experimental result of Comparative Example 1, which is 1.00.

In the experimental results of the comparative examples and examples shown in each of FIGS. 6 to 9, "oil consumption at low RPM and high load" is shown by graph A located at the left end, "oil consumption under pattern conditions" is shown by graph B located second from the left end, "blow-by at low RPM and high load" is shown by graph C located third from the left end, and "friction under pattern conditions" is shown by graph D located fourth from the left end.

Comparative Example 1

In Comparative Example 1, the following piston ring set was employed.
[Top Ring E1]
    Material and surface treatment: Steel+chromium nitride film
    Shape: Thickness 2.30 mm×width 1.00 mm
    Tension: 3.0 N
    Outer peripheral surface: Barrel face shape
    Cross-sectional shape: Rectangular+internal bevel
    Joint gap: 0.25 mm
    Chamfering of joint gap: 0.15 mm
    Chamfering of outer periphery lower surface (axial direction): 0.15 mm
    Chamfering of outer periphery lower surface (radial direction): 0.15 mm
    Joint flow area: 0.113 mm$^2$ [Calculation example: $s1 \times g1 \times f + C1 + C2 + C3 \times 2 = 0.25 \times 0.25 \times 80/73 + 0.15^2/2 + 0.15^2/2 + 0.15^2/2 \times 2 = 0.113$ mm$^2$]
[Second Ring E1] Material and Surface Treatment: Steel+Chemical Treatment
    Shape: Thickness 2.30 mm×width 1.00 mm
    Tension: 2.5 N
    Outer peripheral surface: Tapered shape
    Cross-sectional shape: Scraper
    Joint gap: 0.40 mm
[Oil Ring E1]
    Shape: Thickness 2.55 mm×width 2.00 mm
    Tension: 15 N
    Ear angle: 20° Rail shape: Thickness 2.00 mm×width 0.35 mm
    Rail material and surface treatment: Steel+chromium nitride film
    Rail elastic modulus: 196 GPa (196000 N/mm$^2$)
    Rail outer peripheral surface: Barrel face shape Sliding surface shape: b1=0.15, b2=0.014
Outer peripheral conformability coefficient 0.2
[Calculation example: $3/2 \times Ft \times (d1-a1)^2/(E \times h12 \times a1^3) = 3/2 \times 15 \times (73-2.00)^2/(196000 \times 0.35 \times 2.003) \approx 0.20$]

The joint gap can be measured by inserting a gap gauge into the joint gap with the piston ring set inserted into the cylinder bore. The chamfering of the joint gap and the chamfering of the outer periphery lower surface can be measured from the contour shape of the chamfered portion. The contour shape may be measured manually or by image processing software. The tension can be measured by a manual tension gauge or an automatic tension gauge. The rail shape (thickness×width) can be measured by a micrometer. The rail elastic modulus may be a value specific to the material, or may be measured by a tensile test of the metal material.

As illustrated in (a) of FIG. 6, as described above, each experimental result of Comparative Example 1 (oil consumption at low RPM and high load, oil consumption under pattern conditions, blow-by at low RPM and high load, and friction under pattern conditions) was set to 1.00 as the standard. The ear angle is the angle between the ear of the spacer expander of the oil ring and the axial direction of the cylinder bore. The ears are the ends of the spacer expander that face each rail along the radial direction of the cylinder bore.

Comparative Example 2

In Comparative Example 2, the top ring is different from the configuration of the piston ring set in Comparative Example 1. In Comparative Example 2, the following top ring was employed.
[Top Ring E2]
    Material and surface treatment: Steel+chromium nitride film
    Shape: Thickness 2.30 mm×Width 1.00 mm
    Tension: 3.0 N
    Outer peripheral surface: Barrel face shape
    Cross-sectional shape: Rectangular+internal bevel
    Joint gap: 0.18 mm
    Chamfering of joint gap: 0.10 mm
    Chamfering of outer periphery lower surface (axial direction): 0.10 mm
    Chamfering of outer periphery lower surface (radial direction): 0.08 mm Joint flow area: 0.067 mm$^2$ The experimental results for Comparative Example 2 are shown below and in (b) of FIG. 6.
    Oil consumption at low RPM and high load: 1.10
    Oil consumption under pattern conditions: 0.85
    Blow-by at low RPM and high load: 0.65
    Friction under pattern conditions: 1.00

Comparative Example 3

In Comparative Example 3, the oil ring is different from the configuration of the piston ring set in Comparative Example 1. In Comparative Example 3, the following oil ring was employed.
[Oil Ring E2]
    Shape: Thickness 2.20 mm×Width 2.00 mm
    Tension: 15 N
    Ear angle: 20°
    Rail shape: Thickness 1.60 mm×width 0.35 mm
    Rail material and surface treatment: Steel+chromium nitride film
    Rail outer peripheral surface: Barrel face shape Sliding surface shape: b1=0.15, b2=0.014
Outer peripheral conformability coefficient 0.4
The experimental results for Comparative Example 3 are shown below and in (c) of FIG. 6.
Oil consumption at low RPM and high load: 0.70
Oil consumption under pattern conditions: 0.85
Blow-by at low RPM and high load: 1.00
Friction under pattern conditions: 0.85

Example 1

In Example 1, a top ring E2, a second ring E1, and an oil ring E2 were employed as a piston ring set.
The experimental results for Example 1 are shown below and in (d) of FIG. 6.
Oil consumption at low RPM and high load: 0.80
Oil consumption under pattern conditions: 0.70
Blow-by at low RPM and high load: 0.65
Friction under pattern conditions: 0.85
In Example 1, the joint flow area of the top ring E2 is 0.1 mm$^2$ or less, and the outer peripheral conformability coefficient of the oil ring E2 is 0.3 or more. By setting the joint flow area of the top ring E2 to 0.1 mm$^2$ or less, blow-by gas can be reduced. Since the outer peripheral conformability coefficient of the oil ring E2 is 0.3 or more, the oil ring E2 follows the inner surface of the cylinder bore favorably. Therefore, excess oil that has adhered to the inner surface of the cylinder bore due to the top ring E2 is favorably scraped off by the oil ring E2. Therefore, in a case where the piston ring set according to Example 1 is used, the reduced oil consumption due to the oil ring E2 exceeds the increased oil consumption due to the top ring E2. That is, by using the piston ring set according to Example 1, blow-by gas, oil consumption, and friction can all be reduced. In particular, the friction of the piston ring set according to Example 1 which includes both the top ring E2 and the oil ring E2 can be reduced to the same level as the friction of the piston ring set according to Comparative Example 3, which includes the oil ring E2.

Example 2

In Example 2, the oil ring is different from the configuration of the piston ring set in Example 1. In Example 2, the following oil ring was employed.
[Oil Ring E3]
Shape: Thickness 2.20 mm×Width 2.00 mm
Tension: 15 N
Ear angle: 20°
Rail shape: Thickness 1.60 mm×width 0.35 mm
Rail material and surface treatment: Steel+chromium nitride film
Rail outer peripheral surface: Tapered face shape
Sliding surface shape: t1=5.5°, t2=0.014, t3=0.075
Outer peripheral conformability coefficient 0.4
The experimental results for Example 2 are shown below and in (a) of FIG. 7.
Oil consumption at low RPM and high load: 0.70
Oil consumption under pattern conditions: 0.60
Blow-by at low RPM and high load: 0.65
Friction under pattern conditions: 0.70
In Example 2, the oil consumption and friction were reduced more than in Example 1 because the outer peripheral surface of the oil ring had a tapered face shape.

Example 3

In Example 3, the oil ring is different from the configuration of the piston ring set in Example 1. In Example 3, the following oil ring was employed.

[Oil Ring E4]
Shape: Thickness 2.20 mm×Width 2.00 mm
Tension: 15 N
Ear angle: 20°
Rail shape: Thickness 1.60 mm×width 0.35 mm
Rail material and surface treatment: Steel+chromium nitride film
Rail outer peripheral surface: Bullet face shape
Sliding surface shape: bt1=0.08, bt2=0.011
Outer peripheral conformability coefficient 0.4
The experimental results for Example 3 are shown below and in (b) of FIG. 7.
Oil consumption at low RPM and high load: 0.60
Oil consumption under pattern conditions: 0.65
Blow-by at low RPM and high load: 0.65
Friction under pattern conditions: 0.75
In Example 3, the oil consumption and friction were reduced more than in Example 1 because the outer peripheral surface of the oil ring had a bullet face shape.

Comparative Example 4

In Comparative Example 4, a piston ring set having a top ring E1, a second ring E2 described below, and an oil ring E1 was employed.
[Second Ring E2]
Material and surface treatment: Steel+chemical treatment
Shape: Thickness 2.30 mm×Width 1.00 mm
Tension: 2.5 N
Outer peripheral surface: Tapered shape
Cross-sectional shape: Scraper
Joint gap: 0.25 mm
The experimental results for Comparative Example 4 are shown below and in (a) of FIG. 8.
Oil consumption at low RPM and high load: 1.25
Oil consumption under pattern conditions: 0.80
Blow-by at low RPM and high load: 1.15
Friction under pattern conditions: 1.10

Example 4

In Example 4, a top ring E2, a second ring E2, and an oil ring E2 were employed as a piston ring set.
The experimental results for Example 4 are shown below and in (b) of FIG. 8.
Oil consumption at low RPM and high load: 0.80
Oil consumption under pattern conditions: 0.50
Blow-by at low RPM and high load: 0.65
Friction under pattern conditions: 0.82

Example 5

In Example 5, the oil ring is different from the configuration of the piston ring set in Example 4. In Example 5, an oil ring E3 was employed.
The experimental results for Example 5 are shown below and in (c) of FIG. 8.
Oil consumption at low RPM and high load: 0.70
Oil consumption under pattern conditions: 0.40
Blow-by at low RPM and high load: 0.65
Friction under pattern conditions: 0.67

Example 6

In Example 6, the oil ring is different from the configuration of the piston ring set in Example 4. In Example 6, an oil ring E4 was employed.

The experimental results for Example 6 are shown below and in (d) of FIG. 8.

Oil consumption at low RPM and high load: 0.60
  Oil consumption under pattern conditions: 0.45
  Blow-by at low RPM and high load: 0.65
  Friction under pattern conditions: 0.72

In comparison with Comparative Example 1, Comparative Example 4 showed increased oil consumption at low RPM and high load, blow-by at low RPM and high load, and friction under pattern conditions. The piston ring set in Comparative Example 4 is composed of a top ring E1 having a joint flow area (0.113 mm$^2$) larger than 0.1 mm$^2$, and a second ring E2 having a joint gap (0.25 mm) smaller than 0.4 mm, and therefore the S1 ratio is smaller than 1.8 (s2/s1=1.0). Therefore, it is presumed that the reason why the experimental results of Comparative Example 4 were worse than those of Comparative Example 1 is that under low RPM and high load conditions, the pressure of the second land increased due to the blow-by gas G, causing the top ring E1 to flutter.

Each of the piston ring sets in Examples 4 to 6 is composed of a top ring E2 having a joint flow area (0.069 mm$^2$) smaller than 0.1 mm$^2$, and a second ring E2 having a joint gap (0.25 mm) smaller than 0.4 mm. In Examples 4 to 6, even though the S1 ratio was smaller than 1.8 (s2/s1≈1.39), the amount of blow-by gas, oil consumption, and friction were reduced compared to Comparative Example 4 or Comparative Example 1. The reason why the experimental results of Examples 4 to 6 were improved compared to the experimental results of Comparative Example 4 or Comparative Example 1 is presumably because the combination of the top ring E2 and the second ring E2 exhibited a synergistic effect that suppressed fluttering of the top ring E2.

Comparative Example 5

In Comparative Example 5, the oil ring is different from the configuration of the piston ring set in Comparative Example 1. In Comparative Example 5, the following oil ring was employed.
[Oil Ring E5]
  Shape: Thickness 2.20 mm×Width 2.00 mm
  Tension: 20 N
  Ear angle: 20°
  Rail shape: Thickness 1.60 mm×width 0.35 mm
  Rail material and surface treatment: Steel+chromium nitride film
  Rail outer peripheral surface: Barrel face shape
  Sliding surface shape: b1=0.15, b2=0.014
  Outer peripheral conformability coefficient 0.54
The experimental results for Comparative Example 5 are shown below and in (a) of FIG. 9.
  Oil consumption at low RPM and high load: 0.55
  Oil consumption under pattern conditions: 0.70
  Blow-by at low RPM and high load: 1.00
  Friction under pattern conditions: 0.95

Comparative Example 6

In Comparative Example 6, the oil ring is different from the configuration of the piston ring set in Comparative Example 1. In Comparative Example 6, the following oil ring was employed.
[Oil Ring E6]
  Shape: Thickness 2.20 mm×Width 2.00 mm
  Tension: 12 N Ear angle: 20°
  Rail shape: Thickness 1.35 mm×width 0.35 mm
  Rail material and surface treatment: Steel+chromium nitride film
  Rail outer peripheral surface: Barrel face shape
  Sliding surface shape: b1=0.15, b2=0.014
  Outer peripheral conformability coefficient 0.54
The experimental results for Comparative Example 6 are shown below and in (b) of FIG. 9.
  Oil consumption at low RPM and high load: 0.60
  Oil consumption under pattern conditions: 0.75
  Blow-by at low RPM and high load: 1.00
  Friction under pattern conditions: 0.70

Example 7

In Example 7, a top ring E2, a second ring E1, and an oil ring E5 were employed as a piston ring set.
The experimental results for Example 7 are shown below and in (c) of FIG. 9.
  Oil consumption at low RPM and high load: 0.65
  Oil consumption under pattern conditions: 0.55
  Blow-by at low RPM and high load: 0.65
  Friction under pattern conditions: 0.95

Example 8

In Example 8, a top ring E2, a second ring E1, and an oil ring E6 were employed as a piston ring set.
The experimental results for Example 8 are shown below and in (d) of FIG. 9.
  Oil consumption at low RPM and high load: 0.70
  Oil consumption under pattern conditions: 0.60
  Blow-by at low RPM and high load: 0.65
  Friction under pattern conditions: 0.70

Example 9

In Example 9 illustrated in (e) of FIG. 9, a top ring E2, a second ring E2, and an oil ring E5 were employed as a piston ring set.
The experimental results for Example 9 are shown below.
  Oil consumption at low RPM and high load: 0.65
  Oil consumption under pattern conditions: 0.35
  Blow-by at low RPM and high load: 0.65
  Friction under pattern conditions: 0.92

Example 10

In Example 10, a top ring E2, a second ring E2, and an oil ring E6 were employed as a piston ring set.
The experimental results for Example 10 are shown below and in (f) of FIG. 9.
  Oil consumption at low RPM and high load: 0.70
  Oil consumption under pattern conditions: 0.40
  Blow-by at low RPM and high load: 0.65
  Friction under pattern conditions: 0.67

In Example 7, the oil consumption was reduced more than in Example 1 by employing the oil ring E5 having a tension of 20 N and an outer peripheral conformability coefficient of 0.54. In Example 9, the oil consumption was reduced more than in Example 4 by employing the oil ring E5. In Example 8, the oil consumption and friction were reduced compared to Example 1 by employing the oil ring E6 having a tension of 12 N and an outer peripheral conformability coefficient of 0.54. In Example 10, the oil consumption and friction were reduced more than in Example 4 by employing the oil ring E6.

REFERENCE SIGNS LIST

1 Piston ring set, 2 Piston, 2*a* Outer surface, 11*d*, 21*d*, 31*d* Outer peripheral surface, 3 Cylinder bore, 3*a* Inner surface, 10 Top ring, 11, 21 Main body portion, 11*a* Side surface (first side surface), 11*b* Side surface (second side surface), 11*c*, 21*c*, 31*c* Inner peripheral surface, 11*e* Outer peripheral lower surface chamfered surface, 13 Joint end portion (first joint end portion), 13*a* Joint chamfered surface (first joint chamfered surface), 14 Joint end portion (second joint end portion), 14*a* Joint chamfered surface (second joint chamfered surface), 15 Joint portion, 16 Joint chamfered portion (first joint chamfered portion), 17 Joint chamfered portion (second joint chamfered portion), 18, 18*a*, 18*b* Outer peripheral lower surface chamfered portion, 20 Second ring, 23 Joint end portion (third joint end portion), 24 Joint end portion (fourth joint end portion), 25 Joint portion, 30 Oil ring, 31 Rail, D1 Axial direction, D2 Radial direction

The invention claimed is:

1. A piston ring set comprising a top ring and an oil ring, wherein the piston ring set is inserted into a cylinder bore of an internal combustion engine while attached to a piston,
   wherein the top ring comprises an annular main body portion,
   wherein the annular main body portion comprises:
      an inner peripheral surface;
      an outer peripheral surface;
      a first side surface and a second side surface substantially perpendicular to the inner peripheral surface; and
      a first joint end portion and a second joint end portion that face each other to form a joint portion,
   wherein the oil ring comprises a pair of rails facing each other,
   wherein a joint flow area of the top ring is 0.1 mm² or less,
   wherein an outer peripheral conformability coefficient of the oil ring is 0.3 or more,
   wherein the main body portion comprises:
      a first joint chamfered surface located between the first joint end portion and the outer peripheral surface;
      a second joint chamfered surface located between the second joint end portion and the outer peripheral surface, and
      an outer peripheral lower surface chamfered surface located between one of the first side surface and the second side surface and the outer peripheral surface, and
   wherein, when the top ring and the oil ring are inserted into the cylinder bore while attached to the piston:
      a first joint chamfered portion is formed between an inner surface of the cylinder bore and the first joint chamfered surface;
      a second joint chamfered portion is formed between the inner surface and the second joint chamfered surface; and
      an outer peripheral lower surface chamfered portion is formed between the inner surface and the outer peripheral lower surface chamfered surface;
      the joint flow area is expressed as s1×g1×f+C1+C2+2×C3, where a gap between the first joint end portion and the second joint end portion is s1, a gap between an outer surface of the piston and the inner surface of the cylinder bore is g1, a correction coefficient based on an inner diameter of the cylinder bore is f, a size of the first joint chamfered portion is C1, a size of the second joint chamfered portion is C2, and a size of the outer peripheral lower surface chamfered portion is C3; and
   the outer peripheral conformability coefficient is expressed as $3/2 \times Ft \times (d1-a1)^2/(E \times h12 \times a1^3)$, where a tension of the oil ring is Ft, the inner diameter of the cylinder bore is d1, a thickness of each of the pair of rails along a radial direction of the cylinder bore is a1, an elastic modulus of a material forming each of the pair of rails is E, and a width of each of the pair of rails along an axial direction of the cylinder bore is h12.

2. The piston ring set according to claim 1,
   wherein the outer peripheral conformability coefficient of the oil ring is 0.8 or less.

3. The piston ring set according to claim 1,
   wherein a dimension of the outer peripheral lower surface chamfered portion along the radial direction is smaller than a dimension of the outer peripheral lower surface chamfered portion along the axial direction.

4. The piston ring set according to claim 1, further comprising a second ring,
   wherein the second ring comprises an annular second main body portion comprising a third joint end portion and a fourth joint end portion that face each other to form a second joint portion, and
   wherein a ratio of a gap between the third joint end portion and the fourth joint end portion to a gap between the first joint end portion and the second joint end portion is 1.8 or less.

5. The piston ring set according to claim 1,
   wherein each outer peripheral surface of the pair of rails has either a tapered face shape or a bullet face shape.

6. A piston ring set comprising a top ring and an oil ring, wherein the piston ring set is inserted into a cylinder bore of an internal combustion engine while attached to a piston,
   wherein the top ring comprises an annular main body portion,
   wherein the annular main body portion comprises:
      an inner peripheral surface;
      an outer peripheral surface;
      a first side surface and a second side surface substantially perpendicular to the inner peripheral surface; and
      a first joint end portion and a second joint end portion that face each other to form a joint portion,
   wherein the oil ring comprises a pair of rails facing each other,
   wherein a joint flow area of the top ring is 0.1 mm² or less,
   wherein an outer peripheral conformability coefficient of the oil ring is 0.3 or more,
   wherein the piston ring set further comprises a second ring,
   wherein the second ring comprises an annular second main body portion comprising a third joint end portion and a fourth joint end portion that face each other to form a second joint portion, and
   wherein a ratio of a gap between the third joint end portion and the fourth joint end portion to a gap between the first joint end portion and the second joint end portion is 1.8 or less.

* * * * *